United States Patent
Yang et al.

(10) Patent No.: US 10,671,214 B2
(45) Date of Patent: Jun. 2, 2020

(54) GLOBAL COARSE BASELINE CORRECTION CHARGE INJECTION

(71) Applicant: Synaptics Incorporated, San Jose, CA (US)

(72) Inventors: Wenwei Yang, Sunnyvale, CA (US); Chunbo Liu, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 282 days.

(21) Appl. No.: 15/485,374

(22) Filed: Apr. 12, 2017

(65) Prior Publication Data
US 2018/0300013 A1     Oct. 18, 2018

(51) Int. Cl.
G06F 3/041     (2006.01)
G06F 3/044     (2006.01)

(52) U.S. Cl.
CPC .......... *G06F 3/0418* (2013.01); *G06F 3/044* (2013.01)

(58) Field of Classification Search
CPC ......... G06F 2203/04108; G06F 3/0418; G06F 3/044; G06F 3/0416; G06F 3/0412; H03F 3/2171; H03F 1/223; H03F 3/4508; H03F 1/0261; G01R 19/32; H03K 19/01714; G05F 1/10; H02M 3/155; G02F 1/1309
See application file for complete search history.

(56) References Cited

U.S. PATENT DOCUMENTS

| | | | |
|---|---|---|---|
| 8,373,451 B1* | 2/2013 | Ferguson | H03K 19/01714 327/108 |
| 2009/0102560 A1* | 4/2009 | Harvey | H03F 3/4508 330/257 |
| 2014/0021994 A1* | 1/2014 | Tanaka | H02M 3/155 327/170 |
| 2014/0049232 A1* | 2/2014 | Chen | G05F 1/10 323/234 |
| 2014/0160371 A1* | 6/2014 | Tokita | G02F 1/1309 349/12 |
| 2014/0266449 A1* | 9/2014 | Montazer | H03F 1/0261 330/261 |
| 2014/0285448 A1* | 9/2014 | Kim | G06F 3/0412 345/173 |
| 2014/0375384 A1* | 12/2014 | Bohannon | H03F 3/2171 330/251 |

(Continued)

*Primary Examiner* — Richard J Hong
(74) *Attorney, Agent, or Firm* — Ferguson Braswell Fraser Kubasta PC

(57) ABSTRACT

A global coarse baseline correction charge injection circuit comprises: an output capacitor, a slew rate control circuit, a current generator, a first current mirror, and a second current mirror. The output capacitor is configured to store a global coarse baseline correction charge. The slew rate control circuit is configured to receive a modulated voltage, a positive input current, and a negative input current as inputs, and provide a proportional-to-supply-voltage slew-rate controlled voltage as an output voltage to charge the output capacitor. The current generator is configured to receive a supply voltage as an input and provide a proportional-to-supply-voltage (PTSV) current as an output. The first current mirror is configured to mirror the PTSV current to the slew rate control circuit as the positive input current. The second current mirror is configured to mirror the PTSV current to the slew rate control circuit as the negative input current.

15 Claims, 14 Drawing Sheets

(56) References Cited

U.S. PATENT DOCUMENTS

| | | | |
|---|---|---|---|
| 2015/0205433 A1* | 7/2015 | Mizuhashi | G06F 3/0416 345/174 |
| 2015/0214897 A1* | 7/2015 | Motamed | H03F 1/223 330/257 |
| 2016/0124544 A1* | 5/2016 | Kang | G06F 3/044 345/174 |
| 2016/0188115 A1* | 6/2016 | Seo | G06F 3/0416 345/173 |
| 2017/0023626 A1* | 1/2017 | Kung | G01R 19/32 |
| 2017/0351380 A1* | 12/2017 | Ahn | G06F 3/044 |
| 2018/0173342 A1* | 6/2018 | Lee | G06F 3/044 |

* cited by examiner

GLOBAL COARSE BASELINE CORRECTION CHARGE INJECTION

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones and tablet computers). Such touch screen input devices are typically superimposed upon or otherwise collocated with a display of the electronic system. Many proximity sensor devices utilize capacitive sensing.

SUMMARY

According to some embodiments, a global coarse baseline correction charge injection circuit comprises: an output capacitor, a slew rate control circuit, a current generator, a first current mirror, and a second current mirror. The output capacitor is configured to store a global coarse baseline correction charge. The slew rate control circuit is configured to receive a modulated voltage, a positive input current, and a negative input current as inputs and provide a proportional-to-supply-voltage slew-rate controlled voltage as an output voltage to charge the output capacitor with the global coarse baseline correction charge. The current generator is configured to receive a supply voltage as an input and provide a proportional-to-supply-voltage current as an output. The first current mirror is configured to mirror the proportional-to-supply-voltage current to the slew rate control circuit as the positive input current. The second current mirror is configured to mirror the proportional-to-supply-voltage current to the slew rate control circuit as the negative input current.

According to some embodiments, the global coarse baseline correction charge injection circuit can be included in a processing system. In some embodiments, the processing can be implemented as an application specific integrated circuit (ASIC) or as some other integrated circuit. According to some embodiments, the processing system is configured for a capacitive sensing input device.

In some embodiments, the global coarse baseline correction charge injection circuit can be included in a capacitive sensing input device that also includes a capacitive sensor electrode and a charge integrator configured that is configured to couple with the capacitive sensor electrode. The global coarse baseline correction charge injection circuit is configured to generate a global coarse baseline correction charge and to mirror out a copy of the global coarse baseline correction charge to an input of the charge integrator.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements, and.

DETAILED DESCRIPTION

Figure 1:
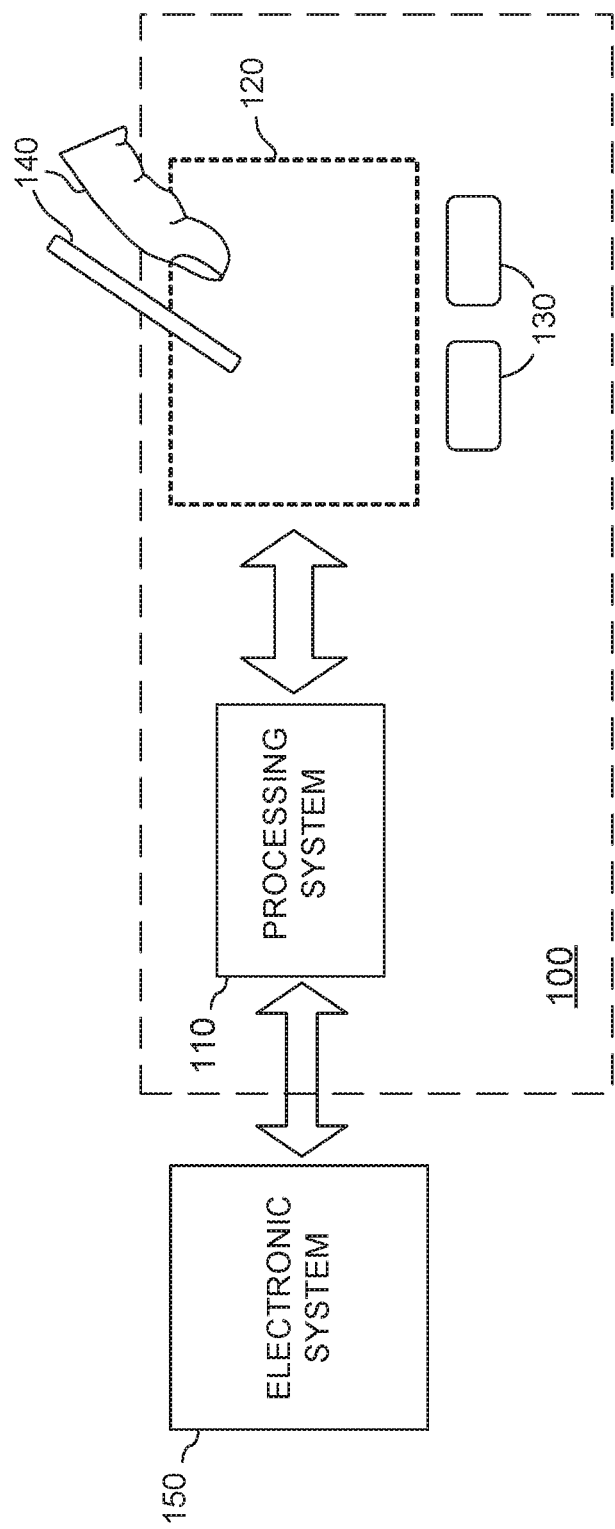
FIG. 1 illustrates a block diagram of an example input device coupled with a host electronic system/device, in accordance with embodiments.

The following Description of Embodiments is merely provided by way of example and not of limitation. Furthermore, there is no intention to be bound by any expressed or implied theory presented in the preceding Background, Summary, or Brief Description of Drawings or the following Description of Embodiments.

Overview of Discussion

Many conventional Global Coarse Baseline Correction (GCBC) solutions develop a charge injection charge by driving a square wave voltage to several (i.e., 3~4) serially connected current limiting resistors preceding one or more GCBC capacitors. All but one of the series resistor was switched out one after the other to speed up the charge delivery at various time of the charge delivering phase. These conventional techniques result in a plain tooth current profile with a long tail at end. This conventional current limiting scheme and resulting current profile have some drawbacks.

The GCBC charges produced by circuits and techniques described herein are ratio-metric to supply voltage. In some embodiments, this ratio-metric property supports analog to digital convertor (ADC) reference voltages that are also ratio-metric to the supply voltage. In this manner, all input information to the ADC has the same property so that the system can be immune to supply voltage variation. The approach described herein overcomes many drawbacks of the above discussed conventional techniques, and achieves: high charge delivery efficiency and accuracy, high charge delivery speed, well controlled maximum injection current, and well maintained ratio-metric property with respect to supply voltage.

Herein, various embodiments are described that provide GCBC charge injection circuits, input devices, processing systems, and techniques of operation that facilitate improved usability. In various embodiments described herein, the input device may be a capacitive sensing input device. Herein, a slew rate controlled charge injection circuit, in the form of a GCBC charge injection circuit, is described which produces a square-wave current profile for GCBC to achieve high charge delivery accuracy and speed, in comparison to conventional techniques for GCBC. As will be described, the slew rate can be adjusted, such as by adjusting register bits, based on a sensing frequency requirement of an input device to which the GCBC charge injection circuit provides GCBC charge injection current(s). This slew rate control scheme, in the form of a proportional-to-supply-voltage slew rate control circuit within the GCBC charge injection circuit, facilitates a slew rate that is proportional to supply voltage in order to preserve ratio-metric property of charge delivery. A pre-charge scheme for the proportional-to-supply-voltage slew rate control circuit is also described herein. As will be discussed, use of the pre-charge scheme facilitates the elimination of delay and overshoot at start-up of the proportional-to-supply voltage slew rate control circuit. A well-controlled predictable maximum injection current is achieved as an output of the GCBC charge injection circuit by tying the output to a capacitor ratio in the proportional-to-supply-voltage slew rate control circuit, and is further assisted by current trimming within a proportional-to-supply-voltage current generator that provides input currents to the proportional-to-supply-voltage slew rate control circuit.

Discussion begins with a description of an example input device with which or upon which various embodiments described herein may be implemented. An example sensor electrode pattern is then described. This is followed by description of an example processing system and some components thereof, including a GCBC charge injection circuit. The processing system may be utilized with or as a portion of an input device, such as a capacitive sensing input device, and may be coupled with one or more sensor electrodes (i.e., one or more capacitive sensor electrodes). A block diagram of a GCBC charge injection circuit is described, followed by discussion of the GCBC charge an description of the layout and operation of subcomponents and circuits which make up the GCBC charge injection circuit, to include description of: a proportional-to-supply-voltage slew rate control circuit; first and second pre-charge circuits which may be coupled to the proportional-to-supply-voltage slew rate control circuit; and a proportional-to-supply-voltage current generator circuit.

Example Input Device

Turning now to the figures, FIG. 1 is a block diagram of an example input device 100, in accordance with various embodiments. Input device 100 may be configured to provide input to an electronic system/device 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic systems could be a host or a slave to the input device.

Input device 100 can be implemented as a physical part of an electronic system 150, or can be physically separate from electronic system 150. As appropriate, input device 100 may communicate with parts of the electronic system using any one or more of the following: buses, networks, and other wired or wireless interconnections. Examples of such busses, networks, wired, and/or wireless connections include, but are not limited to: Inter-Integrated Circuit (I2C), Serial Peripheral Interface (SPI), Personal System 2 (PS/2), Universal Serial Bus (USB), Bluetooth ®, Radio Frequency (RF), and Infrared Data Association (IrDA).

In FIG. 1, input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near input device 100, in which input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g., a touch surface) of input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected onto an input surface of input device 100.

Input device 100 may utilize any combination of sensor components and sensing technologies to detect user input in the sensing region 120. Input device 100 comprises one or more sensing elements for detecting user input. As several non-limiting examples, input device 100 may use acoustic, ultrasonic, capacitive, elastive, resistive, inductive, and/or optical input sensing techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements (i.e., capacitive sensor electrodes) to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Collectively transmitters and receivers may be referred to as sensor electrodes or sensor elements. Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

In some embodiments, one or more receiver electrodes may be operated to receive a resulting signal when no transmitter electrodes are transmitting (e.g., the transmitters are disabled). In this manner, the resulting signal represents noise detected in the operating environment of sensing region 120. In this manner, in some embodiments, the resulting signal represents noise detected in the operating environment of sensing region 120. For example, display noise of a nearby or co-located (e.g., overlapping) display may be represented in the resulting signal that is received during transcapacitive sensing.

In FIG. 1, a processing system 110 is shown as part of input device 100. Processing system 110 is configured to operate the hardware of input device 100 to detect input in sensing region 120. Processing system 110 comprises parts of or all of one or more integrated circuits (ICs) and/or other circuitry components. (For example, a processing system for a mutual capacitance (i.e., transcapacitive) sensor device may comprise transmitter circuitry configured to transmit signals with transmitter sensor electrodes, and/or receiver circuitry configured to receive signals with receiver sensor electrodes). In some embodiments, processing system 110 also comprises electronically-readable instructions, such as firmware code, software code, and/or the like, includes memory to store these instructions, and may further include a processor to execute these instructions. In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor modules configured to operate sensing element(s) or other structures to detect input and determination modules configured to determine positions of any inputs objects detected. For example, a sensor module may perform one or more of absolute capacitive sensing and transcapacitive sensing to detect inputs, and a determination module may determine positions of inputs based on the detected capacitances or changes thereto. In some embodiments, other modules or functionality may be included in processing system 110; for example, an identification module may be included and configured to identify gestures from detected inputs.

In some embodiments, processing system 110 responds to user input (or lack of user input) in sensing region 120 directly by causing one or more actions. Example actions include changing operation modes, as well as Graphic User Interface (GUI) actions such as cursor movement, selection, menu navigation, and other functions. In some embodiments, processing system 110 provides information about the input (or lack of input) to some part of the electronic system (e.g., to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. As one example, "zero-dimensional" positional information includes near/far or contact/no contact information. As another example, "one-dimensional" positional information includes positions along an axis. As yet another example, "two-dimensional" positional information includes motions in a plane. As still another example, "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, input device 100 may be a touch screen, and sensing region 120 overlaps at least part of an active area of a display screen. For example, input device 100 may comprise substantially transparent sensor electrodes overlaying the display screen and provide a touch screen interface for the associated electronic system 150. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. Input device 100 and the display screen may share physical elements. For example, some embodiments may utilize some of the same electrical components for displaying and sensing. As another example, the display screen may be operated in part or in total by processing system 110.

It should be understood that while many embodiments are described in the context of a fully functioning apparatus, the mechanisms are capable of being distributed as a program product (e.g., software) in a variety of forms. For example, the mechanisms that are described may be implemented and distributed as a software program on information bearing media that are readable by electronic processors (e.g., non-transitory computer-readable and/or recordable/writable information bearing media readable by processing system 110 or component(s) thereof). Additionally, the embodiments apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other non-transitory storage technology.

Example Sensor Electrode Pattern

Figure 2:
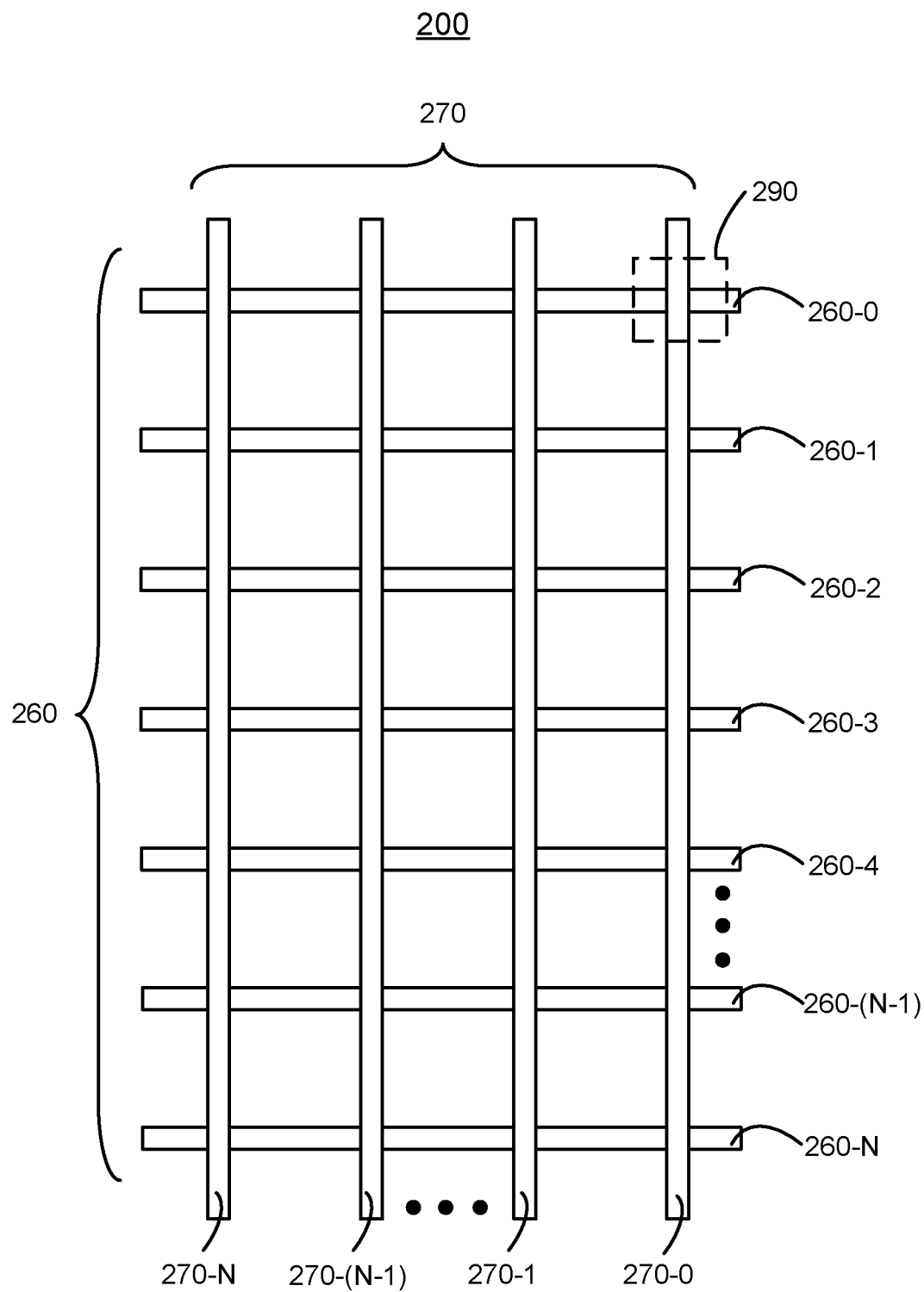
FIG. 2 shows a portion of an example sensor electrode pattern which may be utilized in a sensor to generate all or part of the sensing region of an input device, such as a capacitive sensing input device, according to some embodiments.

FIG. 2 shows a portion of an example sensor electrode pattern 200 which may be utilized in a sensor to generate all or part of the sensing region of input device 100, according to various embodiments. Input device 100 is configured as a capacitive sensing input device when utilized with a capacitive sensor electrode pattern. For purposes of clarity of illustration and description, a non-limiting simple rectangular sensor electrode pattern 200 is illustrated. It is appreciated that numerous other sensor electrode patterns may be employed with the techniques described herein, including but not limited to: patterns with a single sensor electrode; patterns with a single set of sensor electrodes; patterns with two sets of sensor electrodes disposed in a single layer (without overlapping); patterns with two sets of sensor electrodes disposed in a single layer employing jumpers at crossover regions between sensor electrodes; patterns that utilize one or more display electrodes of a display device such as one or more segments of a common voltage (VCOM) electrode; patterns with one or more of source electrodes, gate electrodes, anode electrodes, and cathode electrodes; and patterns that provide individual button electrodes.

The illustrated sensor electrode pattern is made up of a first plurality of sensor electrodes 270 (270-0, 270-1 . . . 270-(n−1), 270-n) and a second plurality of sensor electrodes 260 (260-0, 260-1, 260-2, 260-3, 260-4 . . . 260-(n−1), 260-n) which overlay one another, in this example. In many embodiments, processing system 110 is configured to operate the second plurality of sensor electrodes 260 as transmitter electrodes by driving them with transmitter signals and the first plurality of sensor electrodes 270 as receiver electrodes by receiving resulting signals with them. Other embodiments, may reverse the roles of sensor electrodes 260 and 270. In the illustrated example, sensing pixels are centered at locations where transmitter and receiver electrodes cross. Capacitive pixel 290 illustrates one of the capacitive pixels generated by sensor electrode pattern 200 during transcapacitive sensing. It is appreciated that in a crossing sensor electrode pattern, such as the illustrated example, some form of insulating material or substrate is typically disposed between transmitter electrodes 260 and receiver electrodes 270. However, in some embodiments, transmitter electrodes 260 and receiver electrodes 270 may be disposed on the same layer as one another through use of routing techniques and/or jumpers. In various embodiments, touch sensing includes sensing input objects anywhere in sensing region 120 and may comprise: no contact with any surfaces of the input device 100, contact with an input surface (e.g., a touch surface) of the input device 100, contact with an input surface of the input device 100 coupled with some amount of applied force or pressure, and/or a combination thereof.

When accomplishing transcapacitive measurements, capacitive pixels, such as capacitive pixel 290, are areas of localized capacitive coupling between transmitter electrodes 260 and receiver electrodes 270 (e.g., between transmitter electrode 260-0 and receiver electrode 270-0). The capacitive coupling between transmitter electrodes 260 and receiver electrodes 270 changes with the proximity and motion of input objects in the sensing region associated with transmitter electrodes 260 and receiver electrodes 270.

In some embodiments, sensor electrode pattern 200 is "scanned" to determine these capacitive couplings. That is, the transmitter electrodes 260 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 270 to be independently determined.

The receiver electrodes 270 may be operated singly or multiply to acquire resulting signals. The resulting signals may be used to determine measurements of the capacitive couplings at the capacitive pixels where transmitter electrodes 260 and receiver electrodes 270 cross or interact to measure a transcapacitance.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more sensor electrodes 260 or 270 may be operated to perform absolute capacitive sensing at a particular instance of time. For example, sensor electrode 270-0 may be charged and then the capacitance of sensor electrode 270-0 may be measured. In such an embodiment, an input object 140 interacting with sensor electrode 270-0 alters the electric field near sensor electrode 270-0, thus changing the measured capacitive coupling. In this same manner, a plurality of sensor electrodes 270 may be used to measure absolute capacitance and/or a plurality of sensor electrodes 260 may be used to measure absolute capacitance. It should be appreciated that when performing absolute capacitance measurements the labels of "receiver electrode" and "transmitter electrode" lose the significance that they have in transcapacitive measurement techniques, and instead a sensor electrode 260 or 270 may simply be referred to as a "sensor electrode" or may continue to use its designation as a transmitter electrode or a receiver electrode even though they are used in the same manner during absolute capacitive sensing.

Capacitive images, transcapacitive measurements, and absolute capacitance measurements can be adjusted for the background capacitance of the sensor device for more efficient processing. For example, various techniques may be employed internal and/or external to an ASIC/processing system to subtract/offset some amount of the baseline capacitance that is known to be present in an absolute capacitive measurement. In absolute capacitive sensing, such charge offsetting improves the dynamic range of an amplifier of the ASIC/processing system that is used to amplify a signal which includes an input object related component on top of the baseline absolute capacitance signal measurement. This is because the component of the signal attributed to presence of an input object can be more greatly amplified (without amplifier saturation) if some of the baseline portion is removed by internal offsetting.

Many techniques for internal offset (internal to the ASIC/processing system) of a baseline charge are known in the art and include utilizing an offsetting capacitance in parallel with a feedback capacitor of the amplifier and/or injecting charge to an input of the amplifier that is also coupled with the sensor electrode(s) from which capacitance is being measured through the receipt/input of a resulting signal at the amplifier. Charge injection can be accomplished with a globally generated charge (e.g., a GCBC charge that is generated remotely from the charge integrator which integrates charge from a sensor electrode), and may additionally be accomplished with a locally generated correction charge that is generated near the charge integrator which integrates charge from a sensor electrode.

In some embodiments, using techniques herein, one or more portions of a printed circuit (e.g., a flexible printed circuit, a printed circuit board, a lithographically printed circuit, or other type of printed circuit) that includes routing traces used to couple sensing signals to and/or from sensors in a sensing region of a sensing device can be used to offset some amount of the baseline capacitance measured during capacitive sensing. This type of charge offsetting is accomplished external to the ASIC/processing system. It should be appreciated that any of the external charge offsetting techniques described herein may be utilized alone or may be used in combination with one or more internal charge offsetting techniques such as the GCBC charge injection techniques described herein.

Example Processing System

Figure 3:
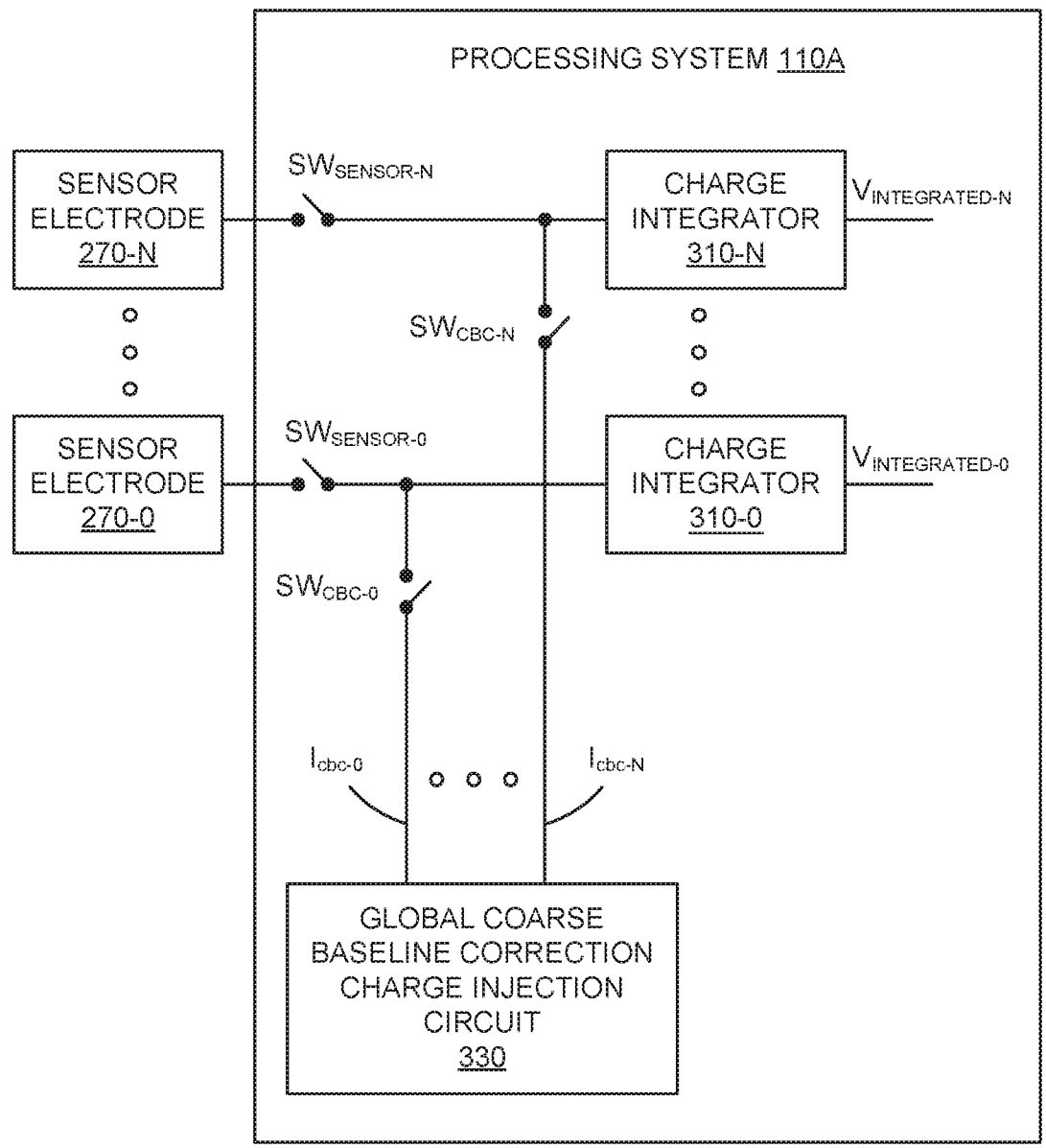
FIG. 3 illustrates a block diagram of some components of an example processing system that may be utilized with an input device, according to various embodiments.

FIG. 3 illustrates a block diagram of some components of an example processing system 110A that may be utilized with an input device (e.g., in place of processing system 110 as part of input device 100), according to various embodiments. As described herein, input device 100 is a capacitive sensing input device. Processing system 110A may be implemented with one or more Application Specific Integrated Circuits (ASICSs), one or more Integrated Circuits (ICs), one or more controllers, or some combination thereof. In one embodiment, processing system 110A is communicatively coupled with one or more transmitter electrode(s) and receiver electrode(s) that implement a sensing region 120 of an input device 100. In some embodiments, processing system 110A and the input device 100 of which it is a part may be disposed in or communicatively coupled with an electronic system 150, such as a display device, computer, smart phone, tablet computer, or other electronic system. In some embodiments, processing system 110A may be coupled with and used to operate or provide information to one or more components of an electronic system 150, such as to a display, a wireless transceiver, an input device (e.g., an audio input device, an image input device, a proximity sensing input device, or other user input device).

Processing system 110A and/or components thereof may be coupled with sensor electrodes of a sensor electrode pattern, such as sensor electrode pattern 200, among others. For example, processing system 110A is coupled with one or more sensor electrodes (260, 270) of a sensor electrode pattern (e.g., sensor electrode pattern 200) of input device 100.

As depicted, processing system 110A includes at least one charge integrator 310 (e.g. 310-0, . . . 310-N) and a global coarse baseline correction (GCBC) charge injection circuit 330. A charge integrator, such as charge integrator 310-0, operates and is configured to couple with a sensor electrode to receive, as an input, a resulting signal in the form of a charge that is then integrated into an output voltage. For example, in FIG. 3, when SWSENSOR-0 is closed, charge integrator 310-0 is coupled with, and receives as an input charge from, sensor electrode 270-0. This charge is integrated into an output voltage VINTEGRATED-0. GCBC charge injection circuit 330 is also coupled to the input of charge integrator 310-1, and operates to inject a GCBC charge, Icbc-0, onto the input of charge integrator 310-N when switch SWCBC-0 is closed. The injected GCBC charge, in the form of current Icbc-0, offsets all or some portion of the baseline capacitance of sensor electrode 270-0 by combining with the resulting signal from sensor electrode 270-0 prior to integration by integrator 310-0. In some embodiments, the GCBC charge injection may be supplemented by a local coarse baseline correction charge injection on the input of integrator 310-0.

In some embodiments, charge integrator 310-0 may be the only charge integrator 310 in processing system and may be coupled in turn to one or more sensor electrodes. In other embodiments, as illustrated, processing system 110A may also include one or more additional charge integrators 310, such as charge integrator 310-N. Charge integrator 310-N is coupled to sensor electrode 270-N through switch SWSENSOR-N and operates to integrate a charge from sensor electrode 270-N into an output voltage VINTEGRATED-N. GCBC charge injection circuit 330 is also coupled to the input of charge integrator 310-N, and operates to inject a GCBC charge, in the form of current Icbc-N, onto the input of charge integrator 310-N when switch SWCBC-N is closed. The injected GCBC charge, Icbc-N, offsets all or some portion of the baseline capacitance of sensor electrode 270-N by combining with the resulting signal from sensor electrode 270-N prior to integration by integrator 310-N. In some embodiments, the GCBC charge injection may be supplemented by a local coarse baseline correction charge injection on the input of integrator 310-N.

In various capacitive sensing embodiments, processing system 110A includes, among other components and operations that have been previously described herein, logic and circuitry for operating sensor electrodes of a sensor electrode pattern for capacitive sensing and for processing resulting signals from sensor electrodes to determine the presence and location of an input object (e.g., input object 140) with respect to a sensing region (e.g., sensing region 120). Among other things, this logic/circuitry controls the operation of switches SWSENSOR-0 . . . SWSENSOR-N and switches SWCBC-0 . . . SWCBC-N.

In various embodiments, processing system 110A comprises sensor circuitry and logic that operate to interact with the sensor electrodes, of a sensor electrode pattern, that are utilized to generate a sensing region, such as sensing region 120. This includes operating a first plurality of sensor electrodes (e.g., sensor electrodes 260) to be silent, to be driven with a transmitter signal, to be used for transcapacitive sensing, and/or to be used for absolute capacitive sensing. This also includes operating a second plurality of sensor electrodes (e.g., sensor electrodes 270) to be silent, to be driven with a transmitter signal, to be used for transcapacitive sensing, and/or to be used for absolute capacitive sensing. The capacitive sensor operating aspects of processing system 110A may be implemented as hardware (e.g., hardware logic and/or other circuitry) and/or as a combination of hardware and instructions stored in a non-transitory manner in a computer readable storage medium.

Processing system 110A is configured to acquire transcapacitive resulting signals by transmitting with a first one of a plurality of sensor electrodes of the input device and receiving with a second one of the plurality of sensor electrodes. During transcapacitive sensing, processing system 110A operates to drive (i.e., transmit) transmitter signals on one or more sensor electrodes of a first plurality of sensor electrodes (e.g., one or more of transmitter electrodes 260). A transmitter signal may be a square wave, sine wave, trapezoidal wave, or some other waveform. In a given time interval, processing system 110A may drive or not drive a transmitter signal (waveform) on one or more of the plurality of sensor electrodes. Processing system 110A may also be utilized to couple one or more of the first plurality of sensor electrodes to high impedance, ground, or to a constant voltage when not driving a transmitter signal on such sensor electrodes. In some embodiments, when performing transcapacitive sensing, processing system 110A drives two or more transmitter electrodes of a sensor electrode pattern at one time. When driving two or more sensor electrodes of a sensor electrode pattern at once, each of the transmitter signals may be coded according to a code of a plurality of codes. The code may be altered, such as lengthening or shortening the code. Processing system 110A also operates to receive resulting signals, via a second plurality of sensor electrodes (e.g., one or more of receiver electrodes 270) during transcapacitive sensing. During transcapacitive sensing, received resulting signals correspond to and include effects corresponding to the transmitter signal(s) transmitted via the first plurality of sensor electrodes. These transmitted transmitter signals may be altered or changed in the resulting signal due to presence of an input object, stray capacitance, noise, interference, and/or circuit imperfections among other factors, and thus may differ slightly or greatly from their transmitted versions. It is appreciated that processing system 110A may, in a similar fashion, transmit transmitter signals on one or more of sensor electrodes 270 and receive corresponding resulting signals on one or more of sensor electrodes 260.

In absolute capacitive sensing, a sensor electrode is both driven and used to receive a resulting signal that results from the signal driven on to the sensor electrode. In this manner, during absolute capacitive sensing, processing system 110A operates to drive (i.e., transmit) a signal on to and receive a resulting signal from one or more of sensor electrodes. For example, this can involve driving and receiving from a single one of sensor electrodes 260 or 270, or on some group of these sensor electrodes. During absolute capacitive sensing, the driven signal may be referred to as an absolute capacitive sensing signal, transmitter signal, or modulated signal, and it is driven through a routing trace that provides a communicative coupling between processing system 110A and the sensor electrode(s) with which absolute capacitive sensing is being conducted.

In various embodiments, processing system 110A includes one or more amplifiers. Such an amplifier may be interchangeably referred to as an "amplifier," a "front-end amplifier," a "receiver," an "integrating amplifier," a "differential amplifier," or the like, and operates to receive a resulting signal at an input and provide an integrated voltage as an output. The resulting signal is from one or more sensor electrodes of a sensor electrode pattern, such as sensor electrode pattern 200. A single amplifier may be coupled with and used to receive a resulting signal from exclusively from a single sensor electrode, may receive signals from multiple sensor electrodes that are simultaneously coupled with the amplifier, or may receive signals from a plurality of sensor electrodes that are coupled one at a time to the amplifier. Processing system 110A may include multiple amplifiers utilized in any of these manners. For example, in some embodiments, a first amplifier may be coupled with a first sensor electrode while a second amplifier is coupled with a second sensor electrode.

An input object determining portion of processing system 110A may be implemented as hardware (e.g., hardware logic and/or other circuitry) and/or as a combination of hardware and instructions stored in a non-transitory manner in a computer readable storage medium, such as in a volatile memory (not shown).

The input object determining portion of processing system 110A operates to compute/determine a measurement of a change in a transcapacitive coupling between a first and second sensor electrode during transcapacitive sensing. In such operation, processing system 110A, then uses such measurements to determine the positional information comprising the position of an input object (if any) with respect to sensing region 120. The positional information can be determined from a transcapacitive image. The transcapacitive image is determined by processing system 110A based upon resulting signals acquired by processing system 110A. The resulting signals are used as or form capacitive pixels representative of input(s) relative to sensing region 120. It is appreciated that processing system 110A operates to decode and reassemble coded resulting signals to construct a transcapacitive image from a transcapacitive scan of a plurality of sensor electrodes.

In embodiments where absolute capacitive sensing is performed with sensor electrodes (e.g., with sensor electrodes 260 and/or 270), processing system 110A also operates to compute/determine a measurement of absolute capacitive coupling to a sensor electrode. For example, processing system 110A operates to determine an absolute capacitance of the sensor electrode (e.g., sensor electrode 270-0) after a sensing signal has been driven on the sensor electrode and a resulting signal received from the sensor electrode. Processing system 110A can analyze the absolute capacitances sensed from one or more sensor electrodes to determine the position of an input object (if any) with respect to sensing region 120.

In some embodiments, processing system 110A comprises decision making logic which directs one or more portions of processing system 110A to operate in a selected one of a plurality of different operating modes based on various inputs. Among other things this decision making logic can direct switches to open or close, set voltage levels, set charge levels, and/or vary the size of one or more adjustable components (e.g., variable capacitors and/or variable resistors). For example, adjusting the values stored in registers of a processor, may select open/closed states for switches.

Example Global Coarse Baseline Charge Injection Circuit

Figure 4:
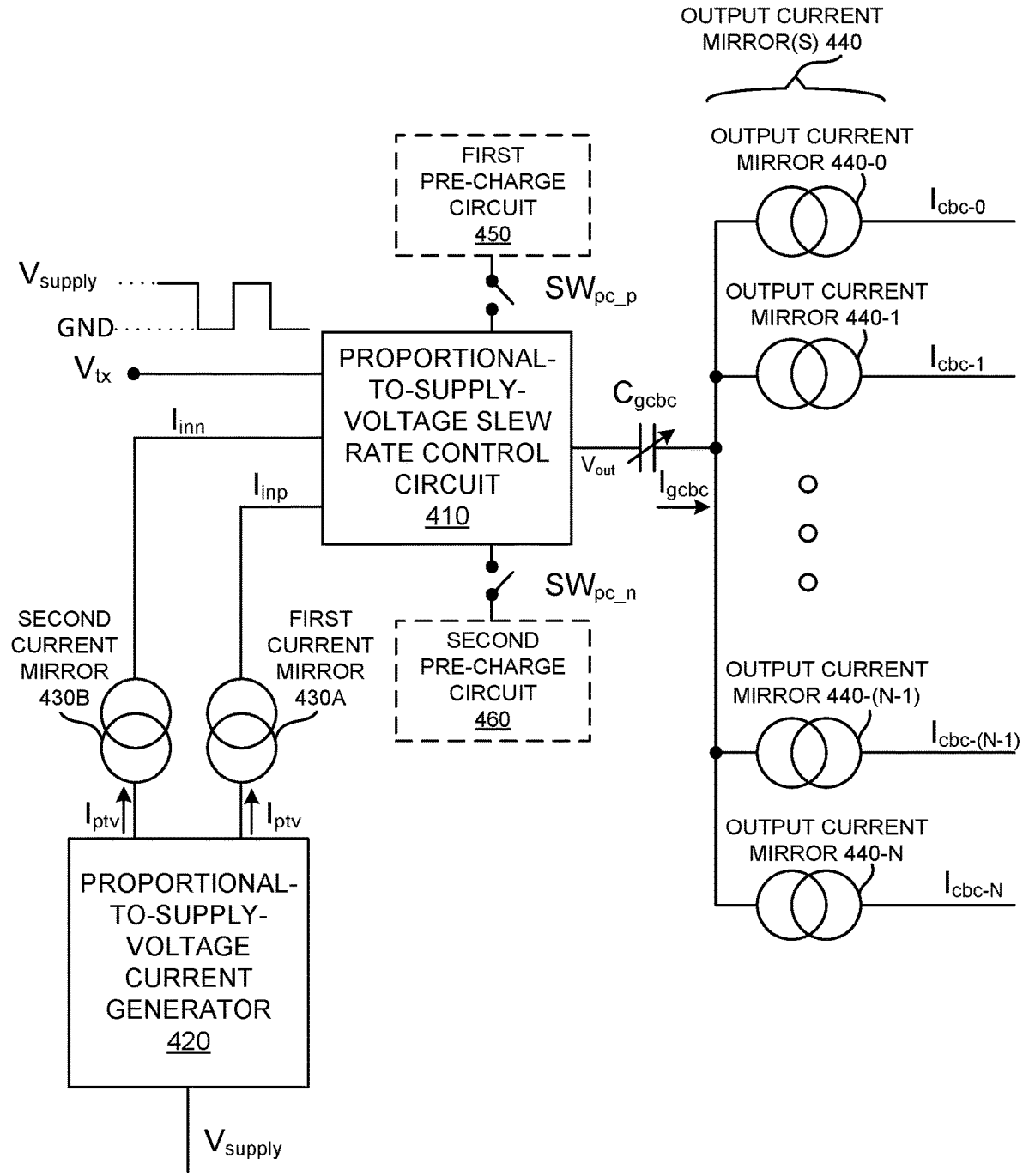
FIG. 4 illustrates a block diagram of a global coarse baseline charge (GCBC) injection circuit, according to various embodiments.

FIG. 4 illustrates a block diagram of a global coarse baseline charge (GCBC) injection circuit 330, according to various embodiments. GCBC injection circuit comprises: an output capacitor, Gcbc; a proportional-to-supply-voltage slew rate control circuit 410; a proportional to supply voltage current generator 420; a first current mirror 430A, and a second current mirror 430B.

Output capacitor Cgcbc is coupled to the output of the proportional-to-supply-voltage slew rate control circuit 410, and receives an output voltage Vout which charges Vgcbc to store a GCBC charge in the form of Igcbc which is ratiometric to the Vtx. As depicted, in some embodiments Cgcbc is variable, and may be varied by processing system 110A configured to store a global coarse baseline correction charge.

Proportional-to-supply-voltage slew rate control circuit 410 is configured to receive as inputs: a modulated voltage, Vtx; a positive input current, Iinp; and a negative input current, Iinn. Vtx is modulated in a square wave pattern with a high of Vsupply and a low of ground (GND). Proportional-to-supply-voltage slew rate control circuit 410 is configured to provide a proportional-to-supply-voltage slew-rate controlled voltage, Vout, as an output voltage to charge the output capacitor, Cgcbc, with the GCBC charge. Proportional-to-supply-voltage slew rate control circuit 410 is described in greater detail in conjunction with FIG. 9A and FIG. 9B.

Proportional-to-supply-voltage current generator 420 is configured to receive a supply voltage, Vsupply, as an input and to provide a proportional-to-supply-voltage current, Iptv, as an output. Proportional-to-supply-voltage current generator 420 is described in greater detail in conjunction with FIG. 10.

With continued reference to FIG. 4, first current mirror 430A is configured to mirror the proportional-to-supply-voltage current, Iptv, to slew rate control circuit 410 as the previously described positive input current; while second current mirror 430B configured to mirror the proportional-to-supply-voltage current, Iptv, to slew rate control circuit 410 as the previously described negative input current. First current mirror 430A and second current mirror 430B are described in greater detail in conjunction with FIG. 10.

With continued reference to FIG. 4, in some embodiments GCBC injection circuit 330 may further comprise a plurality of coarse baseline correction output current mirrors 440 (440-0, 440-1 . . . 440-(N−1), 440-N) that are coupled with the output capacitor Cgcbc and configured to mirror out local copies of the global coarse baseline correction charge to each of a plurality of charge integrators in a processing system 110 for a capacitive sensing input device. For example, output current mirror 440-0 mirrors Igcbc out as Icbc-0, output current mirror 440-1 mirrors Igcbc out as Icbc-1, output current mirror 440-(N−1) mirrors Igcbc out as Icbc-(N−1), and output current mirror 440-N mirrors Igcbc out as Icbc-N.

In some embodiments, proportional-to-supply-voltage slew rate control circuit 410 is integrator based and includes two integrators. In some such embodiments, proportional-to-supply-voltage slew rate control circuit 410 is also coupled through a switch, SWpc_p, with a first pre-charge circuit 450 that is configured to pre-charge an input of the first integrator prior to a first half cycle of operation; and the proportional-to-supply-voltage slew rate control circuit 410 is also coupled through a switch, SWpc_n, with a second pre-charge circuit 460 that is configured to pre-charge an input of the second integrator prior to a second half cycle of operation.

GCBC Charge

GCBC is required to deliver large amount of charge at the time duration dictated by sensing frequency with a given maximum current limit The charge delivery needs to be efficient, accurate, and ratio-metric to supply voltage. With the increase of sensing frequency, the time allocated for GCBC operation is reduced and thus, conventionally, the charge delivery efficiency, accuracy, ratio-metric property suffers as compared to the charge delivery from circuits described herein.

Figure 5:
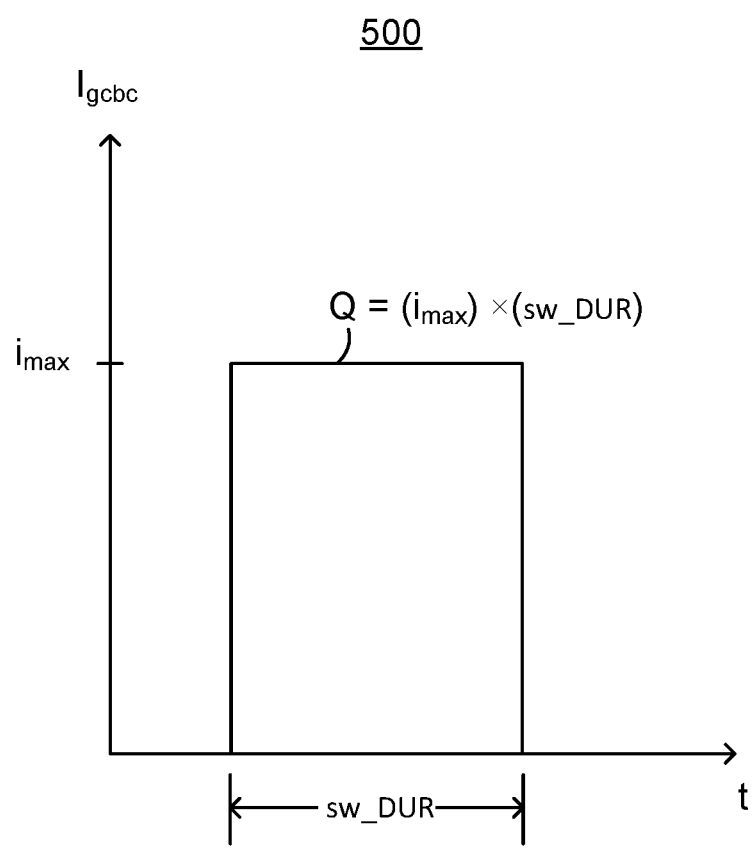
FIG. 5 illustrates a GCBC ideal square wave current profile for efficient charge delivery via injection, according to various embodiments.

FIG. 5 illustrates a GCBC ideal square wave current profile for efficient charge delivery via injection, according to various embodiments. Igcbc is graphed versus time, t. As shown in FIG. 5, with a given maximum current limit, imax, and a given time duration for GCBC operation, sw_DUR, the ideal current profile for efficient charge delivery is a square-wave profile. The more that the GCBC current profile resembles a square-wave, the more efficient and hence the more accurate the charge delivery is. This square wave is represented by Equation 1.

$$Q = (i_{max}) \times (sw\_DuR) \qquad \text{Eq. 1}$$

Figure 6:
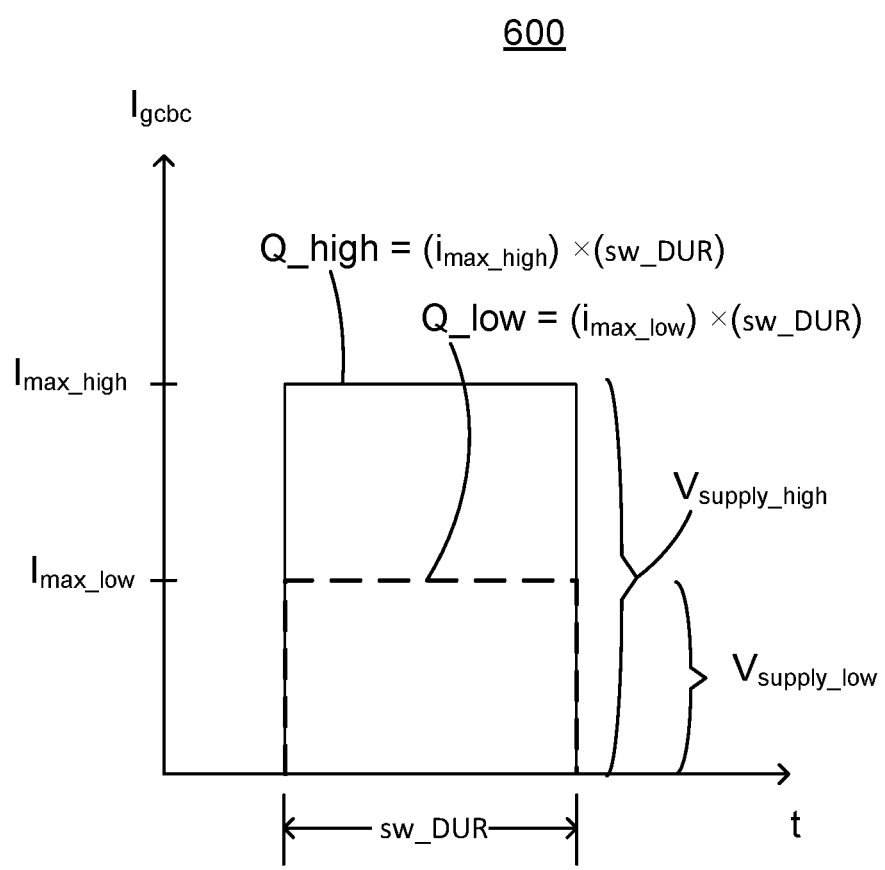
FIG. 6 illustrates a maximum current of a GCBC ideal square wave current profile proportional to supply voltage to deliver proportional-to-supply-voltage charge, according to various embodiments.

FIG. 6 illustrates a maximum current of a GCBC ideal square wave current profile proportional to supply voltage to deliver proportional-to-supply-voltage charge, according to various embodiments. Igcbc is graphed versus time, t. The quantity of charge delivered needs to be ratio-metric to supply voltage so that the impact of supply voltage variation on the touch sensor can be eliminated at system level. This requires the maximum current i_max of the GCBC ideal square wave current profile to be proportional to supply voltage, i.e., $i\_max \propto V_{supply}$, as shown in FIG. 6. Thus, for Imax_high and Vsupply_high the square wave is represented by Equation 2, while for Imax_low and Vsupply_low the square wave is represented by Equation 3.

$$Q\_high = (i_{max\_high}) \times (sw\_DUR) \qquad \text{Eq. 2}$$

$$Q\_low = (i_{max\_low}) \times (sw\_DUR) \qquad \text{Eq. 3}$$

Figure 7:
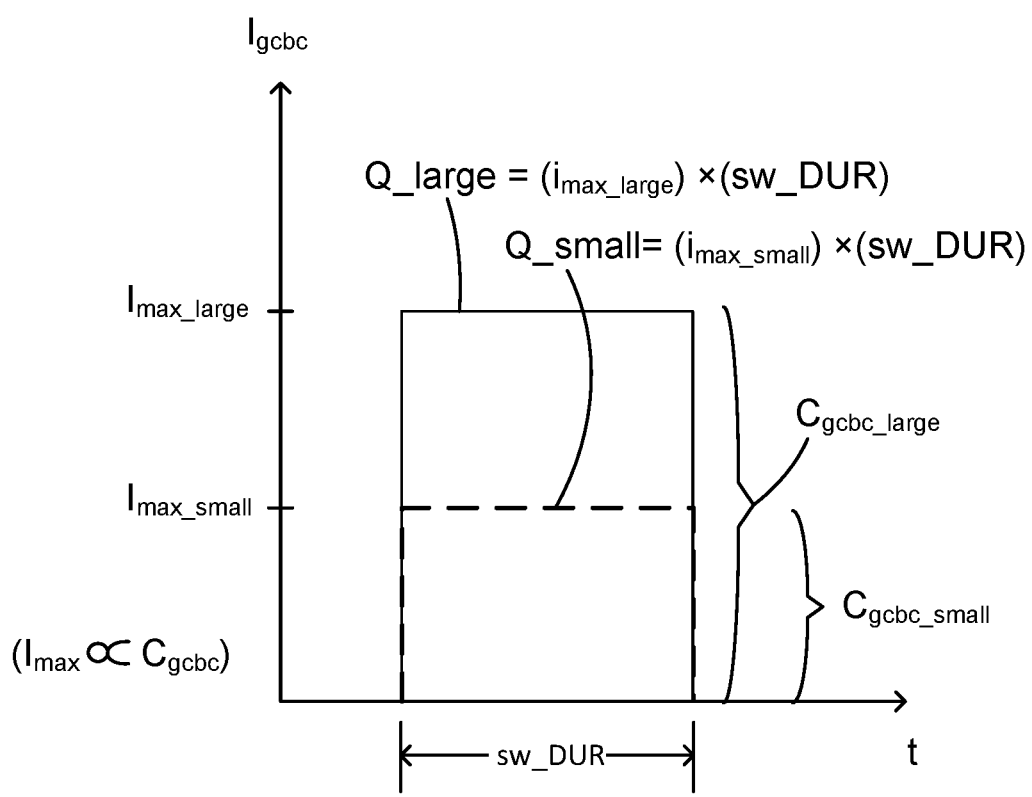
FIG. 7 illustrates a maximum current of a GCBC ideal square wave current profile proportional to GCBC capacitance, Cgcbc, to deliver proportional Cgcbc charge at a given time slot, according to various embodiments.

FIG. 7 illustrates a maximum current of a GCBC ideal square wave current profile proportional to GCBC capacitance, Cgcbc, to deliver proportional to Cgcbc charge at a given time slot, according to various embodiments. Igcbc is graphed versus time, t. When the size of the GCBC capacitance, Cgcbc, is also a variable, e.g., for absolute capacitive sensing mode operation, it is a function of the sensor background capacitor CB. For a given GCBC operation time duration sw_DUR, the maximum current i_max of the GCBC ideal square wave current profile is also proportional to the GCBC capacitance, Cgcbc, as shown in FIG. 7. The slew rate controlled charge delivery circuit of GCBC charge injection circuit 330 described herein is designed to achieve a closely resembled square wave current profile with i_max proportional to supply voltage Vsupply and GCBC capacitance Cgcbc. Thus, for Imax_large and Cgcbc_large the square wave is represented by Equation 4, while for Imax_small and Cgcbc_small the square wave is represented by Equation 5.

$$Q\_large = (i_{max\_large}) \times (sw\_DUR) \qquad \text{Eq. 4}$$

$$Q\_small = (i_{max\_small}) \times (sw\_DUR) \qquad \text{Eq. 5}$$

Figure 8:
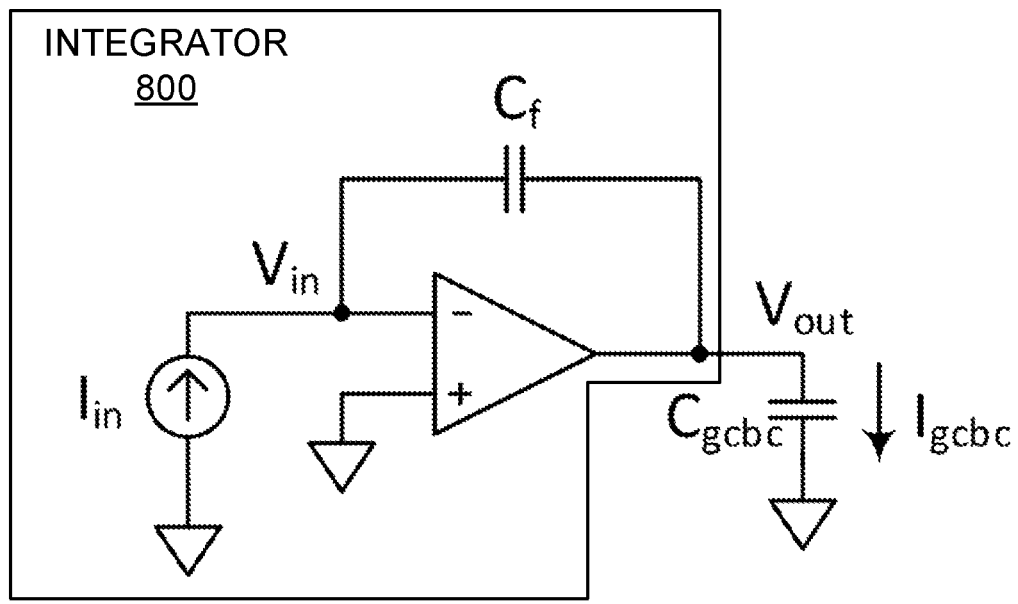
FIG. 8 illustrates a block diagram of a single integrator based global coarse baseline charge injection circuit, according to various embodiments

FIG. 8 illustrates a block diagram of a single integrator based global coarse baseline charge injection circuit, according to various embodiments. FIG. 8 is provided as a simple point of reference for interpreting the dual integrator based global coarse baseline charge injection circuit of FIG. 9A and FIG. 9B. In FIG. 8 illustrates an integrator 800 formed of a feedback capacitor, Cf, and an amplifier 805 which has its non-inverting input coupled with ground, and also receives an input current, Iin, and an input voltage, Vin, on its inverting input. At the output of amplifier 805, the input current Iin has been integrated into voltage Vout, which is feedback to the inverting input of amplifier 805 through feedback capacitor Cf. Vout charges capacitor Cgcbc to create a GCBC charge in the form of Igcbc. The transfer function of integrator 800 is in FIG. 8 and is also shown as Equation 6.

$$H(s) = \frac{V_{out}(s)}{I_{in}(s)} = -\frac{1}{sC_f} \qquad \text{Eq. 6}$$

When applying a time domain step signal as the input current signal iin(t), i.e., $i_{in}(t) = I_{in\_DC} \cdot u(t)$, whose s-domain representation is $$I_{in}(s) = \frac{I_{in\_DC}}{s},$$

the s-domain (i.e., frequency-domain) output voltage is represented by Equation 7.

$$V_{out}(s) = -\frac{1}{sC_f} \cdot I_{in}(s) = -\frac{1}{s^2} \cdot \frac{I_{in\_DC}}{C_f} \qquad \text{Eq. 7}$$

The output voltage in time-domain is represented by Equation 8.

$$v_{out}(t) = -\frac{I_{in\_DC}}{C_f} \cdot t \qquad \text{Eq. 8}$$

Thus, the slew rate of the output voltage Vout(t) is represented by Equation 9, which is a function of input current $I_{in\_DC}$ and the feedback (i.e. integration) capacitor Cf.

$$SR = \frac{d[v_{out}(t)]}{dt} = -\frac{I_{in\_DC}}{C_f} \quad \text{Eq. 9}$$

Since Cf is constant in Equation 9 for a specific register setting, when input current Iin_DC is set to be constant during the slewing, the slew rate is constant, and the output GCBC maximum current, igcbc_max, is also set to be a constant during slewing as represented by Equation 10.

$$i_{gcbc\_max} = C_{gcbc} \cdot \frac{d[v_{out}(t)]}{dt} = -\frac{C_{gcbc}}{C_f} \cdot I_{in\_DC} \quad \text{Eq. 10}$$

By setting the input current Iin_DC as a constant during slewing, a closely resembled square wave current profile for igcbc(t) is achieved. Meanwhile, by setting the input current Iin_DC proportional-to-supply-voltage and not as a function of the GCBC capacitance Cgcbc, igcbc_max is made to proportional to supply voltage Vsupply and GCBC capacitance Cgcbc. Additionally, Cf, can be made a variable by register setting of processing system 110A in order to control the slew rate for different switch durations, sw_DUR, to minimize the power consumption for different sensing frequency requirements.

Figure 9A:
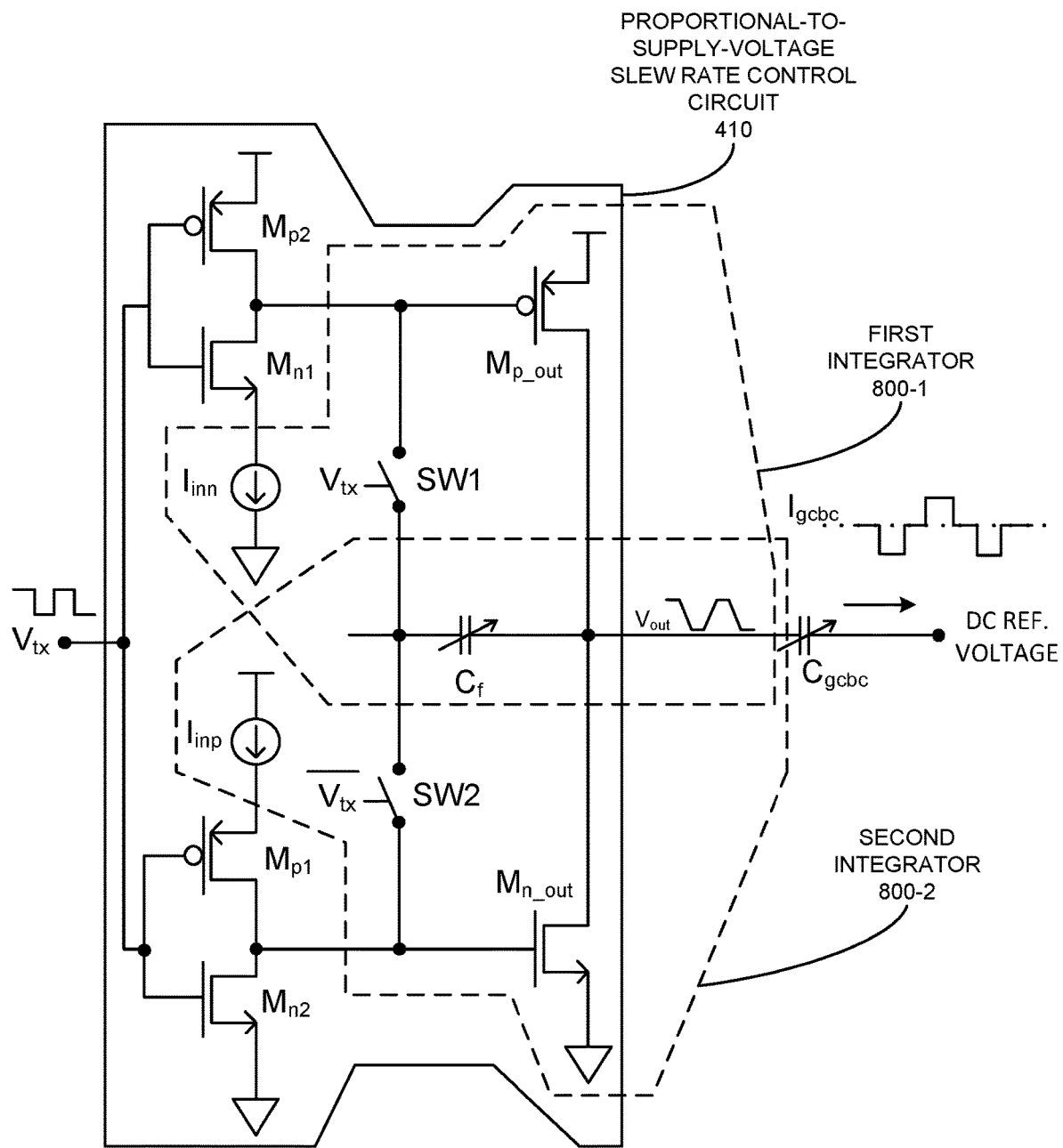
FIG. 9A illustrates a schematic diagram of a proportional-to-supply-voltage slew rate control circuit, according to various embodiments.

FIG. 9A illustrates a schematic diagram of a proportional-to-supply-voltage slew rate control circuit 410, according to various embodiments. Proportional-to-supply-voltage slew rate control circuit 410 includes transistors Mp1, Mp2, Mn1, Mn2, Mp_out, and Mn_out, current source Iinn, current source Iinp, input voltage Vtx, switch SW1, switch SW2, and feedback capacitor Cf (which may be a variable capacitor, and may be varied under control of processing system 110A in some embodiments). In some embodiments, all of the transistors in proportional-to-supply-voltage slew rate control circuit 410 are metal oxide semiconductor field effect transistors (MOSFETs), e.g., some combination of negative channel MOSFET (NMOS) or/and positive channel MOSFET (PMOS) transistors. For example, as illustrated Mn1, Mn2, and Mn_out are NMOS transistors and Mp1, Mp2, and Mp_out are PMOS transistors.

In FIG. 9A, input voltage Vtx is coupled to the gates of Mp1, Mp2, Mn1, and Mn2. The source of Mp2 is coupled to a supply voltage (e.g. Vsupply), while the source of Mn1 is coupled with a negative input current, Iinn, which is provided by a current generator (shown in FIG. 10). The gates of Mp2 and Mn1 are tied together and are also tied to the gate of Mp_out and one side of switch SW1. The source of Mp_out is coupled with a supply voltage (e.g., Vsupply), while the drain of Mp_out is coupled with the output of proportional-to-supply-voltage slew rate control circuit 410, the drain of Mn_out, and a first side of feedback capacitor Cf. The second side of feedback capacitor Cf is tied to the second side of switch SW1 and a first side of switch SW2. Feedback from the drain to the gate of Mp_out is provided through feedback capacitor Cf and switch SW1 when switch SW1 is closed in response to Vtx being high (at this time switch SW2 is open due to Vtx being high). Components Mp_out, Cf, SW1, and input current Iinn form a first integrator, 800-1, of the type illustrated and described in FIG. 8, and operate to integrate Iinn into output voltage Vout which is coupled to a first side of Cgcbc and charges Cgcbc during a positive half of a sensing cycle while Vtx is high.

Figure 10:
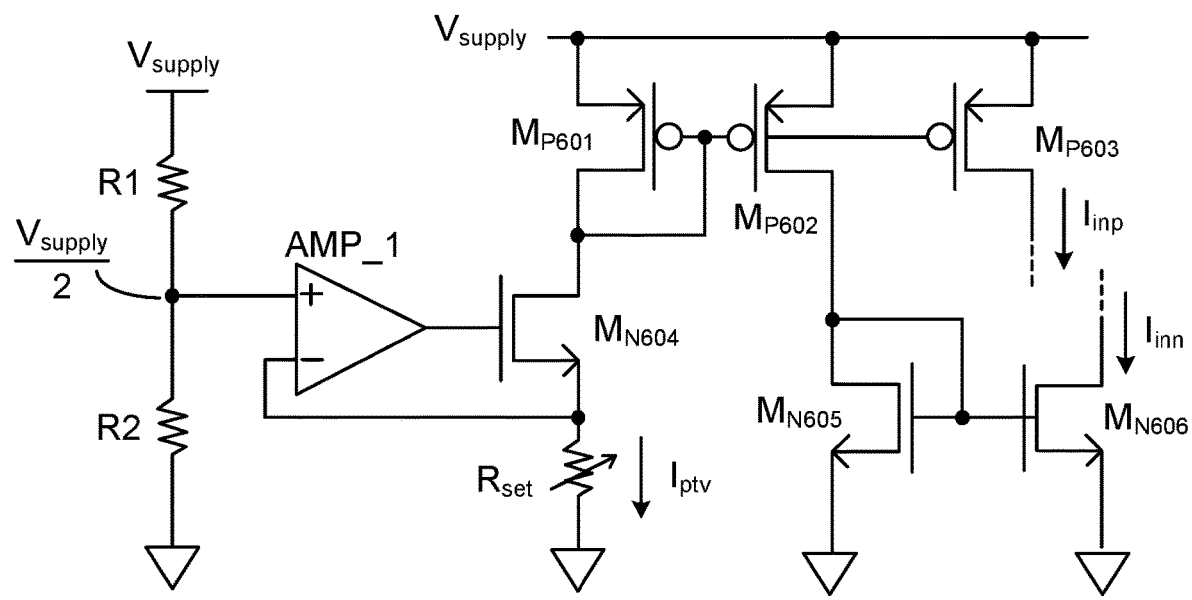
FIG. 10 illustrates a schematic diagram of a proportion-to-supply-voltage current generator, according to various embodiments.

Referring still to FIG. 9A, the source of Mn2 is coupled to ground, while the source of Mp1 is coupled with a positive input current, Iinp, which is provided by the current generator (shown in FIG. 10). The gates of Mp1 and Mn2 are tied together and are also tied to the gate of Mn_out and the second side of switch SW2. The source of Mn_out is coupled with ground, while the drain of Mn_out is coupled with the output of proportional-to-supply-voltage slew rate control circuit 410, the drain of Mp_out, and the first side of feedback capacitor Cf. As previously mentioned, the second side of feedback capacitor Cf is tied to the second side of switch SW1 and the first side of switch SW2. Feedback from the drain to the gate of Mn_out is provided through feedback capacitor Cf and switch SW2, when switch SW2 is closed in response to Vtx being low. Switches SW1 and SW2 operate in opposite states, so when switch SW1 is closee, switch SW1 is open due to Vtx being low). Components Mn_out, Cf, SW2, and input current Iinp form a second integrator, 800-2, of the type illustrated and described in FIG. 8, and operate to integrate Iinp into output voltage Vout which is coupled to a first side of Cgcbc and charges Cgcbc during a negative half of a sensing cycle while Vtx is low.

As can be seen, proportional-to-supply-voltage slew rate control circuit 410 is an implementation of the integrator-based slew rate control circuit, of FIG. 8, with a simple inverter for GCBC charge injection, using a separate integrator for each half of a sensing cycle. For the half sensing cycle when Vtx transitioned from "0" to "1", Mn1/SW1 turns on and Mp1/SW2/Mn_out turns off. Iinn is the current input of a first integrator 800-1 that is composed of Mp_out, Cf and Cgcbc. First integrator 800-1 integrates the negative input current, Iinn, into the output voltage, Vout, during a first half cycle of operation of proportional-to-supply-voltage slew rate control circuit 410. For the other half sensing cycle when Vtx transitioned from "1" to "0", Mp1/SW2 turns on and Mn1/SW1/Mp_out turns off. Iinp is the current input of a second integrator 800-2 composed of Mn_out, Cf and Cgcbc. Second integrator 800-2 integrates the positive input current, Iinp, into the output voltage, Vout, during the second half cycle of operation of proportional-to-supply-voltage slew rate control circuit 410. As can be seen, the first integrator 800-1 and the second integrator 800-2 share feedback capacitor Cf depending upon which integrator is in operation and which of switches SW1 and SW2 is closed to allow completion of a feedback path. When either or both of feedback capacitor Cf and output capacitor Cgcbc is/are variable, the variable values are controlled by register settings that are adjusted by processing system 110A. Adjusting the value of Cf controls the slew rate, while adjusting the value of Cgcbc controls the amount of total GCBC charge, in the form of Igcbc delivered at a DC reference voltage from the second side of Cgcbc.

The proportional-to-supply-voltage slew rate control circuit 410 implemented with inverter described in FIG. 9A has the advantage of simple, low quiescent power consumption and small area.

Figure 9B:
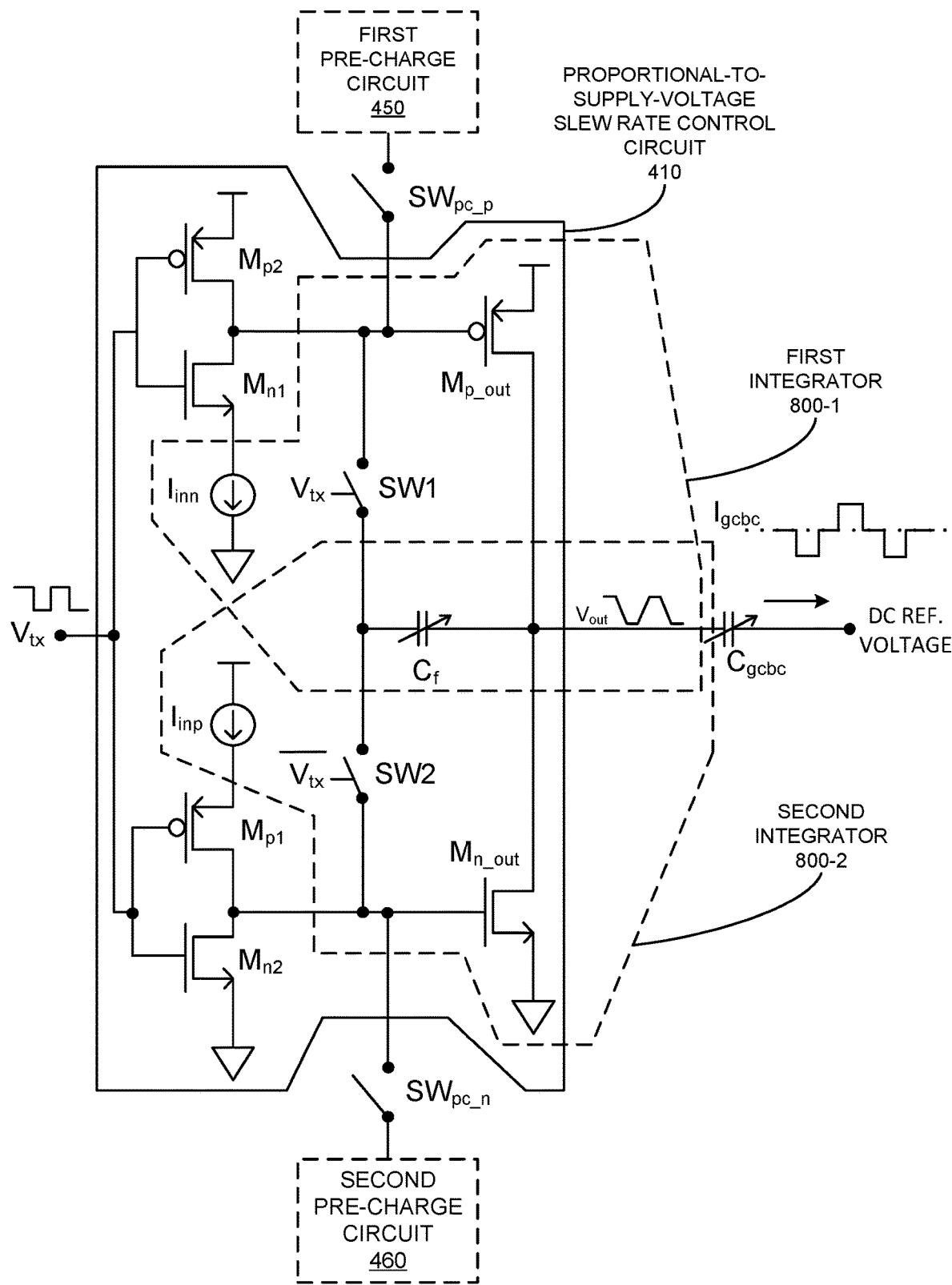
FIG. 9B illustrates a schematic diagram of a proportional-to-supply-voltage slew rate control circuit coupled with pre-charge circuits, according to various embodiments.

FIG. 9B illustrates a schematic diagram of a proportional-to-supply-voltage slew rate control circuit 410 coupled with a pair of pre-charge circuits 450 and 460, according to various embodiments. The proportional-to-supply-voltage slew rate control circuit 410 in FIG. 9B is the same as the circuit in FIG. 9A, except that in FIG. 9B, a first pre-charge circuit 450 has been coupled to the first integrator 800-1 and a second pre-charge circuit has been coupled to the second integrator 800-2. In particular, first pre-charge circuit 450 is coupled to the gate of transistor Mp_out through switch SWpc_p. Switch SWpc_p can be opened and closed by processing system 110A and is timed to close so that a small current is injected onto the gate of Mp_out just before first integrator 800-1 is cycled into operation by Vtx going to a high half cycle. In a similar fashion, second pre-charge circuit 460 is coupled to the gate of transistor Mn_out through switch SWpc_n. Switch SWpc_n can be opened and closed by processing system 110A and is timed to close so that a small current is injected onto the gate of Mn_out just before first integrator 800-2 is cycled into operation by Vtx going to a low half cycle. An example of the construction and operation of first pre-charge circuit 450 and second pre-charge circuit 460 is discussed in conjunction with FIG. 11.

FIG. 10 illustrates a schematic diagram of a proportion-to-supply-voltage current generator 420, according to various embodiments. Current generator 420 includes transistors MP601, MP602, MP603, MN604, MN605, and MN606, resistors R1 and R2, amplifier AMP_1, low temperature coefficient trimmable resistor Rset. In some embodiments, all of the transistors in current generator 420 are metal oxide semiconductor field effect transistors (MOSFETs), e.g., some combination of negative channel MOSFET (NMOS) or/or positive channel MOSFET (PMOS) transistors. For example, as illustrated MN604, MN605, and MN606 are NMOS transistors and MP601, MP602, MP603, are PMOS transistors.

In FIG. 10, a first end of R1 is coupled to a supply voltage, Vsupply, and second end is coupled to a first end of resistor R2 and to the non-inverting input of amplifier AMP_1. A second end of resistor R2 is coupled to ground. Resistors R1 and R2 have the same value form a voltage divider such that the voltage on the non-inverting input of AMP_1 is one half of Vsupply. The output of AMP_1 is coupled to the gate of MN604. The source of MN604 is coupled with a first end of Rset and as feedback to the inverting input of AMP_1. The second end of Rset is coupled with ground. The sources of MP601, MP602, and MP603 are coupled with a supply voltage, Vsupply; and the gates of these three transistors are all tied to one another and coupled to the drain of MN604. The drain of MP602 is coupled to the drain of MN605 and to tied gates of MN605 and MN606. The sources of MN605 and MN606 are coupled with ground. Iinp is taken from the drain of MP603, while Iinn is taken from the drain of MN606.

The input currents in FIGS. 9A and 9B, for each of half sensing cycle, i.e., Iinn and Iinp, are mirrored from a common current source Iptv generated in a proportional-to-supply-voltage current generator 420, where Iptv is defined by Equation 11.

$$I_{ptv} = \frac{V_{supply}}{2 \cdot R_{set}} \qquad \text{Eq. 11}$$

Rset is a low temperature coefficient trimmable resistor, whose process dependent variation can be trimmed out either in a factory setting or under adjustment of processing system 110A.

Figure 11:
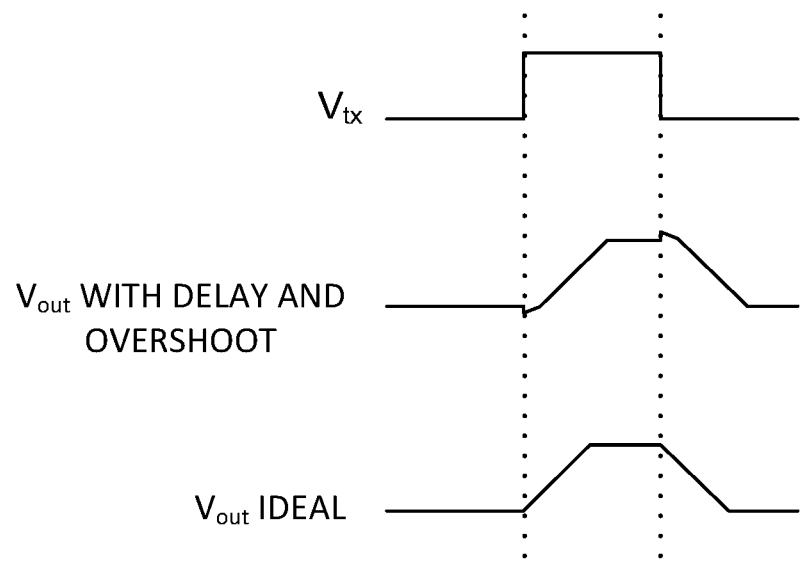
FIG. 11 illustrates a timing illustrating how output voltage tracks input voltage in a proportional-to-supply-voltage slew rate control circuit and how the output voltage changes with and without the inclusion of pre-charge circuits, according to various embodiments.

FIG. 11 illustrates a timing illustrating how output voltage, Vout, tracks input voltage, Vtx, in a global coarse baseline charge injection circuit 330, and how Vout changes with and without the inclusion of pre-charge circuits, according to various embodiments. A first waveform, Vtx, illustrates the input voltage of circuit 330. A second waveform illustrates an ideal output voltage, Vout IDEAL, that is desired. A third waveform illustrates a typical output voltage, Vout WITH DELAY AND OVERSHOOT, of a global coarse baseline charge injection circuit 330 configured with a proportional-to-supply-voltage slew rate control circuit 410 (as shown in FIG. 9A) that does not have pre-charge injected.

The proportional-to-supply-voltage slew rate control circuit 410 with inverters described in FIG. 9A has the advantage of simple, low quiescent power consumption and small area. However, Vout in FIG. 9A has some delay and overshoot at startup as is illustrated by the above described third waveform in FIG. 11. This artifact is due to the fact that, for an inverter composed of Mp_out and Mn_out, one of the transistors is always in cutoff before it turns back on again. When a transistor of this pair of transistors is due to change from cutoff operation region to strong inversion region, it has a time delay. During this time delay, the other of the two transistors of the inverter is already turned off, so the Vout node of FIG. 9A is not driven by either transistor Mp_out or transistor Mn_out, and the gate voltage swing of the to-be turned on transistor couples onto the Vout node, resulting in overshooting. For a GCBC application, since Vtx switching time is well-defined, this issue is resolved and Vout becomes more similar to (or identical to) Vout IDEAL, by adding a short pre-charge phase right before the switching of Vtx, as shown in FIG. 9B by the inclusion of first pre-charge circuit 450 and second pre-charge circuit 460.

Figure 12:
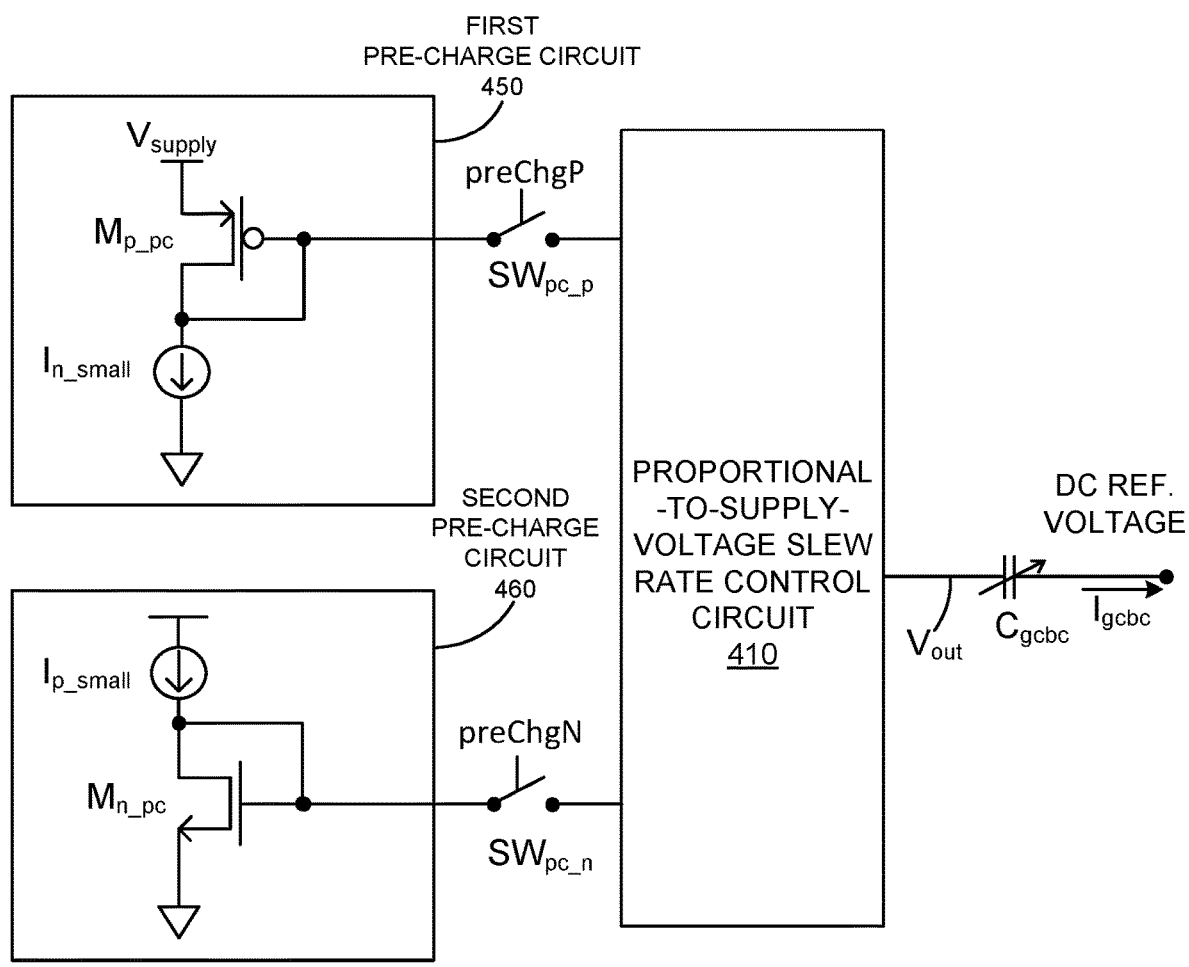
FIG. 12 illustrates a schematic diagram of two pre-charge circuits coupled with a proportional to supply voltage slew rate control circuit, according to various embodiments.

FIG. 12 illustrates a schematic diagram of two pre-charge circuits (450 and 460) coupled with a proportional to supply voltage slew rate control circuit 410, according to various embodiments.

First pre-charge circuit 450 includes a transistor Mp_pc. The source of Mp_pc is coupled with a supply voltage, Vsupply. The gate of Mp_pc is coupled with a first side of switch SWpc_p, and to the drain of Mp_pc. The drain of Mp_pc is also coupled to ground. A small current, In_small, is developed though Mp_pc and is injected into slew rate control circuit 410 when processing system 110A applies a signal, preChgP, to close switch SWpc_p. As was illustrated in FIG. 9B, first pre-charge circuit 450 is coupled to the gate of transistor Mp_out through switch SWpc_p. Switch SWpc_p can be opened and closed by processing system 110A and is timed to close so that a small current is injected onto the gate of Mp_out just before first integrator 800-1 is cycled into operation by Vtx going to a high half cycle.

Second pre-charge circuit 460 includes a transistor Mn_pc. The source of Mn_pc is coupled with ground. The gate of Mn_pc is coupled with a first side of switch SWpc_n, and to the drain of Mn_pc. The drain of Mn_pc is also coupled to a supply voltage, Vsupply. A small current, Ip_small, is developed though Mn_pc and is injected into slew rate control circuit 410 when processing system 110A applies a signal, preChgN, to close switch SWpc_n. As was illustrated in FIG. 9B, second pre-charge circuit 460 is coupled to the gate of transistor Mn_out through switch SWpc_n. Switch SWpc_n can be opened and closed by processing system 110A and is timed to close so that a small current is injected onto the gate of Mn_out just before first integrator 800-2 is cycled into operation by Vtx going to a low half cycle. An example of the construction and operation of first pre-charge circuit 450 and second pre-charge circuit 460 is discussed in conjunction with FIG. 11.

Figure 13:
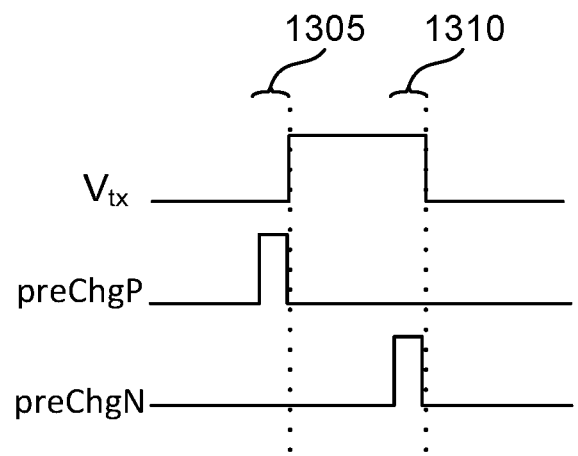
FIG. 13 illustrates a timing diagram for the operation of the switches which control the injection of pre-charge from the pre-charge circuits of FIG. 12 into the proportional-to-supply-voltage slew rate control circuit of FIG. 9B, according to various embodiments.

FIG. 13 illustrates a timing diagram for the operation of the switches, SWpc_n and SWpc_p, which control the injection of pre-charge from the pre-charge circuits 450 and 460 into the proportional-to-supply-voltage slew rate control circuit 410, according to various embodiments. As illustrated, processing system 110A provides signal preChgP in a time period 1305 just before Vtx goes from low to high, and thus causes switch SWpc_p to close and inject charge from first pre-charge circuit 450 into proportional-to-supply-voltage slew rate control circuit 410. As illustrated, processing system 110A provides signal preChgN in a time period 1310 just before Vtx goes from high to low, and thus causes switch SWpc_n to close and inject charge from second pre-charge circuit 460 into proportional-to-supply-voltage slew rate control circuit 410.

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

What is claimed is:

1. A global coarse baseline correction charge injection circuit, said circuit comprising:
   an output capacitor configured as a dedicated capacitor used to store a global coarse baseline correction charge; and
   a slew rate control circuit configured to receive a modulated voltage, a positive input current, and a negative input current as inputs and provide a proportional-to-supply-voltage slew-rate controlled voltage as an output voltage to charge said output capacitor with said global coarse baseline correction charge,
      wherein said slew rate control circuit is integrator based and comprises:
         a first integrator configured to integrate said negative input current into said output voltage during a first half cycle of operation of said slew rate control circuit; and
         a second integrator to integrate said positive input current into said output voltage during a second half cycle of operation of said slew rate control circuit;
         a first pre-charge circuit configured to pre-charge an input of said first integrator prior to said first half cycle of operation; and
         a second pre-charge circuit configured to pre-charge an input of said second integrator prior to said second half cycle of operation.

2. The global coarse baseline correction charge injection circuit of claim 1, further comprising:
   a plurality of coarse baseline correction output current mirrors coupled with said output capacitor and configured to mirror out local copies of said global coarse baseline correction charge to each of a plurality of charge integrators in a processing system for a capacitive sensing input device.

3. The global coarse baseline correction charge injection circuit of claim 1, wherein said first integrator and said second integrator share a feedback capacitor, and wherein said feedback capacitor is a variable capacitor.

4. The global coarse baseline correction charge injection circuit of claim 1, wherein said output capacitor comprises a variable capacitor.

5. The global coarse baseline correction charge injection circuit of claim 1, wherein said global coarse baseline correction charge is ratio-metric to the modulated voltage.

6. The global coarse baseline correction charge injection circuit of claim 1, further comprising:
   a current generator configured to receive a supply voltage as an input and provide a proportional-to-supply-voltage current as an output;
   a first current mirror configured to mirror said proportional-to-supply-voltage current to said slew rate control circuit as said positive input current; and
   a second current mirror configured to mirror said proportional-to-supply-voltage current to said slew rate control circuit as said negative input current.

7. The global coarse baseline correction charge injection circuit of claim 6, wherein said current generator comprises a low temperature coefficient trimmable resistor, whose process dependent variation can be trimmed out.

8. A processing system for a capacitive sensing input device, said processing system, comprising:
   a charge integrator comprising an input configured to switchably couple with a capacitive sensor electrode, said input configured to receive a charge from said capacitive sensor electrode for integration;
   a local coarse baseline correction capacitor coupled with said input and configured to store and provide a local coarse baseline correction charge to offset a background capacitance of said capacitive sensor electrode; and
   a global coarse baseline correction charge injection circuit, switchably coupled to the input of the charge integrator, and configured to generate a global coarse baseline correction charge and to mirror out a copy of said global coarse baseline correction charge to said input of said charge integrator, said circuit comprising:
      an output capacitor configured as a dedicated capacitor used to store said global coarse baseline correction charge;
      a slew rate control circuit configured to receive a modulated voltage, a positive input current, and a negative input current as inputs and provide a proportional-to-supply-voltage slew-rate controlled voltage as an output voltage to charge said output capacitor with said global coarse baseline correction charge,
         wherein the slew rate control circuit is integrator based and comprises:
            a first integrator configured to integrate said positive input current into said output voltage during a first half cycle of operation of said slew rate control circuit, and
            a second integrator to integrate said negative input current into said output voltage during a second half cycle of operation of said slew rate control circuit, wherein said first integrator and said second integrator share a feedback capacitor; and a coarse baseline correction current mirror coupled with said output capacitor and configured to mirror out said copy of said global coarse baseline correction charge.

9. The processing system of claim 8, wherein said feedback capacitor is a variable capacitor.

10. The processing system of claim 8, wherein said global coarse baseline correction charge injection circuit further comprises:
a first pre-charge circuit configured to pre-charge an input of said first integrator prior to said first half cycle of operation; and
a second pre-charge circuit configured to pre-charge an input of said second integrator prior to said second half cycle of operation.

11. The processing system of claim 8, wherein said output capacitor comprises a variable capacitor.

12. The processing system of claim 8, wherein said global coarse baseline correction charge is ratio-metric to said modulated voltage.

13. A capacitive sensing input device comprising:
a capacitive sensor electrode;
a charge integrator comprising an input configured to switchably couple with said capacitive sensor electrode, said input configured to receive a charge from said capacitive sensor electrode for integration;
a local coarse baseline correction capacitor coupled with said input and configured to store and provide a local coarse baseline correction charge to offset a background capacitance of said capacitive sensor electrode;
a global coarse baseline correction charge injection circuit, switchably coupled to the input of the charge integrator, and configured to generate a global coarse baseline correction charge and to mirror out a copy of said global coarse baseline correction charge to said input of said charge integrator, said circuit comprising:

an output capacitor configured as a dedicated capacitor used to store said global coarse baseline correction charge;
a slew rate control circuit configured to receive a modulated voltage, a positive input current, and a negative input current as inputs and provide a proportional-to-supply-voltage slew-rate controlled voltage as an output voltage to charge said output capacitor with said global coarse baseline correction charge,
wherein said slew rate control circuit is integrator based and comprises:
a first integrator configured to integrate said positive input current into said output voltage during a first half cycle of operation of said slew rate control circuit, and
a second integrator to integrate said negative input current into said output voltage during a second half cycle of operation of said slew rate control circuit, and
wherein said global coarse baseline correction charge injection circuit comprises:
a first pre-charge circuit configured to pre-charge an input of said first integrator prior to said first half cycle of operation, and
a second pre-charge circuit configured to pre-charge an input of said second integrator prior to said second half cycle of operation; and
a coarse baseline correction output current mirror coupled with said output capacitor and configured to mirror out said copy of said global coarse baseline correction charge.

14. The capacitive sensing input device of claim 13, wherein said first integrator and said second integrator share a feedback capacitor, and wherein said feedback capacitor is a variable capacitor.

15. The capacitive sensing input device of claim 13, wherein said global coarse baseline correction charge is ratio-metric to said modulated voltage.

* * * * *